April 22, 1930.  J. BIJUR  1,755,628
LUBRICATION OF BEARINGS ON PIVOTED STRUCTURES
Filed July 2, 1927
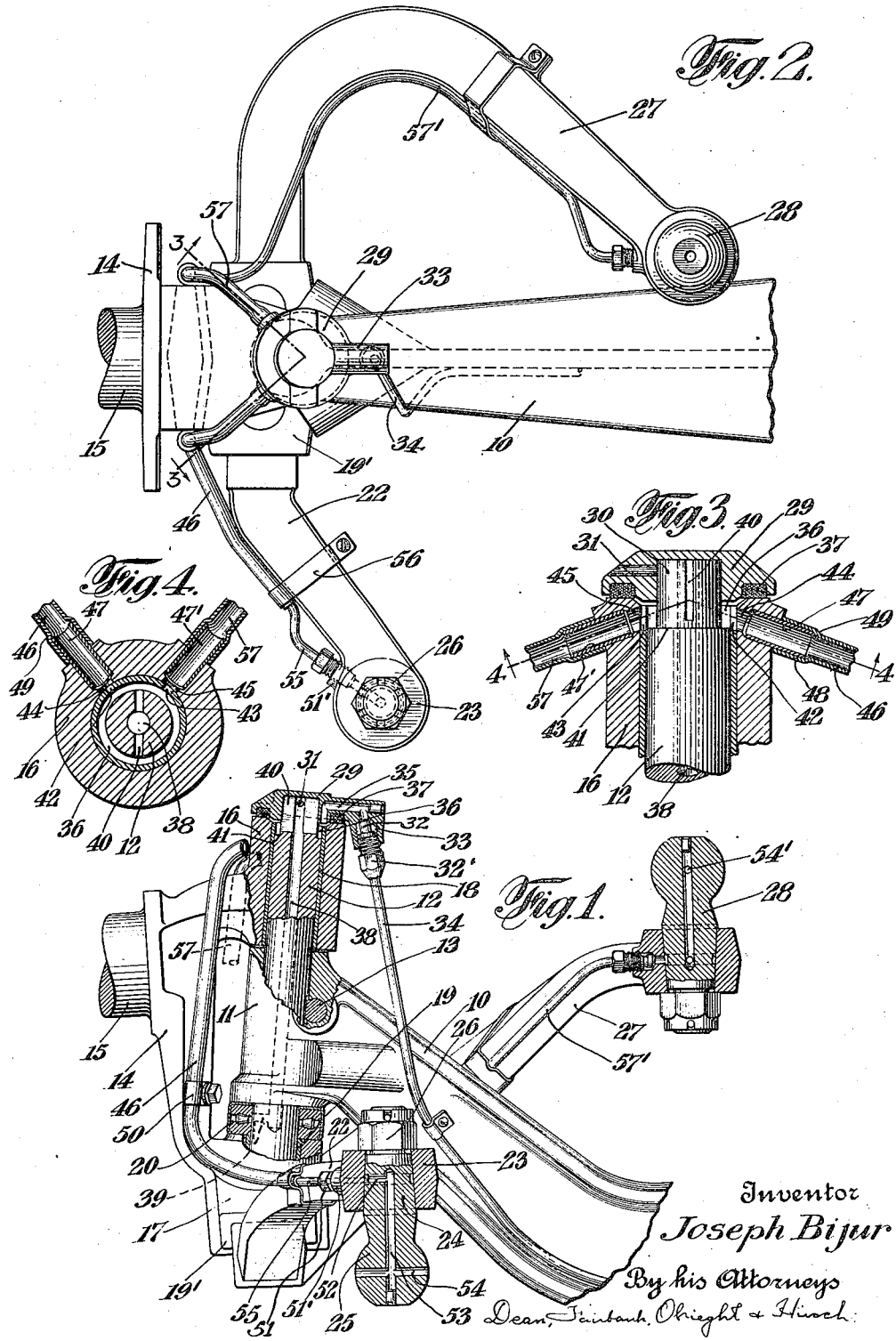
Inventor
Joseph Bijur
By his Attorneys Patented Apr. 22, 1930

1,755,628

UNITED STATES PATENT OFFICE

JOSEPH BIJUR, OF NEW YORK, N. Y., ASSIGNOR TO AUTO RESEARCH CORPORATION, A CORPORATION OF DELAWARE

LUBRICATION OF BEARINGS ON PIVOTED STRUCTURES

Application filed July 2, 1927. Serial No. 202,997.

While certain of the features of my present invention are applicable to gravity flow systems broadly, the invention has a preferred use in association with pressure lubricating systems and more especially for delivering lubricant by gravity flow or displacement from a pressure line to the bearing or bearings of a structure having a swiveled or other movable relation with respect to the main lubricated structure, more especially where it is unfeasible or undesirable to convey the lubricant under pressure past or across such swivel or other connection.

The invention is shown embodied in the steering knuckle of a motor vehicle and provides convenient means for reliably supplying with clean oil, all or any number of the bearings carried by or associated with said knuckle and without the need of selective manipulations by direct manual access to the individual bearings and without the use of any protruding or projecting conduits likely to be torn loose in ordinary use of the vehicle.

In a lubricating system such as that disclosed and claimed in my prior Patent No. 1,632,771, of June 14, 1927, operating under pressure, leak might be incurred at the swivel mount of the steering knuckle were it attempted to force the lubricant thereacross for the bearings associated with the knuckle.

Among the objects of the invention are to provide a lubricating installation, which while retaining all of the advantages of a pressure system in assuring prompt and reliable delivery of the respective charges of lubricant to the vicinities of the various bearings will, nevertheless, avoid leak of lubricant at the swivel mount of the knuckle or analogous parts, without introducing any loose or flapping conduits to bridge across the swivel and will assure the prompt delivery of the lubricant, free from foreign matter at the various bearings carried by the knuckle, each receiving its correct proportion.

In achieving the desired result, I locate the drip plug or other pressure absorbing terminal of a supply line according to my prior patent above-identified, in advance of the swivel mount of the steering knuckle, and I arrange the conduit system on said knuckle for travel of the lubricant to the bearings by simple gravity flow or displacement.

The various bearings are all substantially unitary with the knuckle and preferably rigid seamless metal connecting pipe extends along structural parts of the knuckle between the inlet thereto and the bearings, or, where practicable, the structure of the knuckle may be bored, to provide some or all of the lubricant conduits.

One of the special difficulties arising with gravity flow piping on the knuckle is that the oil would become arrested in an unvented downwardly extending pipe or conduit. Successive charges of lubricant from the source of the control would remain in rather than flow out of such drooping pipe, and only after a column of substantial weight had thus formed, following several lubricating operations, would any lubricant pass to the bearings and at that time an overcharge occurs, substantially the entire previously stanched column pouring into the bearing.

Inasmuch as the bearings of the steering knuckle are not at a common level, the tie rod bearing being usually lower than the king pin bearings and both the former and part of the latter of these usually lower than the drag link bearing, a siphoning action may ensue where the conduits to two or more of these bearings are supplied by gravity flow from a common source. Such action would cause intermittent flooding of the lower of the bearings by drawing lubricant from the line leading to the higher, which latter would, accordingly, receive too little oil and it is one of the objects of the invention to avoid such objectionable siphoning.

An exposed venting aperture introduced to prevent such siphoning or such arrest of lubricant flow, would admit dust and dirt to the course of lubricant flow as long as it remained otherwise effective, but in normal use of the vehicle, it would become clogged with dirt and then no longer serve as a vent.

Still another difficulty encountered in a gravity system on a knuckle is that a conduit extending in whole or in part at level below the outlet therefrom to the bearing, so that oil would normally be trapped therein, might not promptly receive a charge of oil intended to enter the conduit, because of the blocking effect of the air in advance of the trapped column.

I have overcome all of the difficulties noted, without introducing other complications and without weakening or rendering more intricate the mechanical structure of the knuckle. According to my invention, the gravity pipe system is so effectively sealed at its swiveling inlet against entry of dust or dirt that it is even shut off from the external air. The flow facilitating effect of a vent is, however, nevertheless produced according to my invention, broadly by the simple expedient of providing the major part of the volume of those parts of the conduit system on the knuckle that are above the bearing member or members, of a bore of internal diameter or cross-section sufficiently large to permit flow of the lubricant about the air confined therein, so that the air in the system is at all times substantially under atmospheric pressure and neither compressed nor rarefied.

My invention lends itself to the use of bores or passages of quite small diameter in the tie rod and drag link ball studs or other outlets that communicate from the conduit system to the associated bearings, outlets so small that the bore thereof would fill completely with lubricant.

By my invention, any lubricant admitted to the knuckle would readily flow down one side of the large diameter pipe or bore while the air imprisoned in said bore would either remain stationary or pass to another part of the conduit system, without being advanced in or ejected from the system by the flow of lubricant. Lubricant admitted to the knuckle would thus quickly reach a bearing at the lower end of a conduit, and a charge would quickly settle upon any trapped column of lubricant carried by the knuckle and thereby effect prompt overflow to the bearing at the outlet end of the trap. The air imprisoned in the conduit system is of volume so great relative to that of any column of lubricant in any drooping outlet pipe or bore thereof, that the weight of such column exerts insufficient tension to appreciably rarefy the imprisoned air, which remains substantially under atmospheric pressure throughout, whereby the system operates as if it were vented, so that air-blocking, lubricant stanching and siphoning are all precluded.

I claim herein broadly the arrangement of distributing conduits and also the relation whereby siphoning from the higher to the lower of two bearings is avoided. The dust-tight swivel construction and the arrangement for preventing stanching in a downwardly inclined pipe are claimed per se and in combination in my copending application, Serial No. 202,995 filed concurrently herewith as is also the means for lubricating the upper end of the king pin.

The arrangement for preventing the blocking of flow to a trapped column per se is claimed in my copending application, Serial No. 202,996, filed concurrently herewith.

The specific arrangement for lubricating the king pin alone and in combination with the means for lubricating other bearings is the subject matter of my divisional application Serial No. 429,539 filed February 19, 1930, as is also the terminal construction for affixing the upper end of the knuckle conduit.

In the accompanying drawings in which is shown one of various possible embodiments of the several features of the invention, Fig. 1 is a fragmentary elevation of a knuckle partly in section, Fig. 2 is a fragmentary plan of the knuckle.

Fig. 3 is a detail sectional view taken on line 3—3 of Fig. 2 and;

Fig. 4 is a similar view on line 4—4 of Fig. 3.

In the drawings is shown a fragmentary view of a steering knuckle installation, illustratively of the reverse Elliott type, which comprises an axle end 10 having an eye 11 through which extends a king pin 12 pinned rigidly to the axle by the key 13. The bearing ends of the king pin are straddled by the clevis jaws 16 and 17 of a knuckle 14 having a wheel spindle 15, said jaws having bushings 18 and 19 therein, providing bearing surfaces for the upper and lower ends respectively of the king pin. The lower bushing is preferably sealed at its bottom as at 19'. In the embodiment shown, the axle has a thrust roller bearing 20 sustained on the lower of the knuckle clevises. The knuckle shown has rigid with the lower clevis jaw 17 thereof, a tie rod arm 22, provided with a tapered socket 23, in which is secured the correspondingly tapered shank 24 of a downwardly extending ball stud 25 which provides a swivel bearing at its lower end for the corresponding socket (not shown) of the tie rod. The ball stud 25 is secured in place by an appropriate nut 26 threaded on the upper end thereof. The knuckle also has a drag link arm 27 rigid with the lower clevis jaw thereof, which is inclined upward therefrom, to the outer end of which there is affixed an upwardly extending ball stud 28, otherwise similar to stud 25 for the tie rod bearing. The present invention, as heretofore noted, is concerned largely with the lubrication of the knuckle, the construction of which, as thus far described, is in itself not my invention.

To lubricate the knuckle, I have provided a lubricant inlet cap 29 having a central aperture within which fits the reduced upper end 30 of the king pin which is made to protrude above the upper end of the upper clevis jaw 16. A cross pin 31 serves to key the cap to the upper end of the king pin, so that the cap is, accordingly, held rigid with the axle.

The lubricant is admitted to the cap 29 preferably through an appropriate flow controlling fitting 32 which is retained by a bushing 32' threaded into the lower face of an integral lug 33 of the cap that protrudes laterally toward the axle side thereof, which in this embodiment is illustratively in turn, supplied through a pipe 34 along the axle. The lubricant is supplied under pressure from a source (not shown) on the vehicle frame to the control fitting, which may be a drip plug of the type disclosed in my patent above identified, and in which the pressure is preferably absorbed so that lubricant passes therebeyond to the knuckle at a measured rate.

The supply cap is bored as at 35 to drip into an annular well 36 formed about the king pin within the upper end of the bushing 18 of the upper king pin bearing, from which well lubricant is supplied to the king pin bearing surface, to the tie rod and to the steer arm in parallel, as hereinafter described.

In order to prevent dust and dirt from entering through the gap between the stationary cap 29 and the rocking or oscillating upper clevis 16, I have provided the construction shown, in which an annular compression gasket 37 is lodged in a circular groove in the cap 29. The gasket is of thickness such that it is compressed when the pin 31 is applied to secure the inlet cap to the king pin.

In a preferred embodiment the king pin is provided with an axial bore 38 of diameter preferably $\frac{7}{16}$ inch or more, extending from the upper extremity thereof down to the level of the roller bearing 20, with which it communicates through a radial bore 39. The upper end of the king pin is provided with a longitudinal slot 40 terminating slightly above the shoulder 41 at the base of the reduced upper end of the king pin, through which lubricant enters bore 38.

The tie rod and the drag link bearings are supplied with lubricant from the well 36 through notches 42 and 43 respectively, in the upper end of the bushing 18, the bottoms of said notches being slightly below the shoulder 41 of the king pin and flush with the bottoms of the downwardly inclined outlet bores 44 and 45 in the upper knuckle clevis 16. The tie rod conduit comprises a length of pipe 46, the upper end of which is connected to the oblique bore 44. For convenience of connection, a short attachment tube 47 is preferably fitted in a corresponding enlargement of bore 44 in the upper knuckle and the upper end of pipe 46 is enlarged as at 48 to encircle the protruding end of tube 47, affording a shoulder 49 abutting the end of said tube. The lubricant passing by gravity to and through pipe 46, the joint will transmit without leak.

The length of pipe 46 extends generally downward along the structure of the knuckle, to which it is clipped as at 50, and along the length of the arm 22 to the eye 23 in which the ball stud 25 is mounted, a terminal fitting 51 serving to affix the outlet end of the pipe in a boss 51 formed on said eye. Ball stud 25 is supplied from the pipe by a radial bore 52 communicating with an axial bore 53 plugged at its lower end and which delivers through radial bores 54 in the stud 25 to the tie rod end (not shown).

The pipe 57 leading to the steering arm is connected to the knuckle clevis 16 in the same manner as the tie rod pipe, just described, corresponding parts being designated by the same reference numerals primed. The pipe has a part 57' which extends along the upwardly inclined steering arm 27, as shown, and delivers into the corresponding upstanding ball stud 28 in the same manner as in the case of the tie rod ball stud, the corresponding parts having the same reference numerals primed.

Although the knuckle rotates in cap 29 during steering, oil held in place at the gasket 37 by capillarity will bridge the gap between the knuckle and the cap, thus preventing the entry of air. Accordingly, unless precluded or offset by appropriate construction or arrangement of parts, the bearings at lower level, such as the tie rod bearing, would siphon lubricant from bearings at higher level, as for instance, from the king pin or drag link bearings, or the lower king pin bearing might siphon from the higher drag link bearing, were the lubricant at any time to form in a continuous column of sufficient weight or height in one of the conduits to a lower bearing, to draw lubricant from the conduit leading to the higher bearing. The weight of uninterrupted column in descending to the tie rod bearing, for instance, would draw with it some or all of the lubricant in the steering arm conduit, depleting the drag link bearing or the conduit thereof and intermittently flooding the tie rod bearing.

In order to avoid such siphoning action to the tie rod bearing, the simple expedient is adopted of forming the pipe 46 which leads downward from the well 36 to the base of the tie rod stud, of relatively large diameter—where oil of the grade of engine lubricating oil is used, not less than $\frac{3}{16}$ inches in bore. Lubricant in passing through said pipe will in that case trickle downward along a side thereof without ever filling the cross-section of the bore of said pipe. Downward flow of lubricant, accordingly, occurs without driving the air contained in the pipe ahead of it. There is thus avoided a continuous column of lubricant in the downwardly extending pipe, of weight sufficient to cause a siphoning action upon the lubricant in the steering arm.

While I may use a conduit that is large from end to end, satisfactory operation ensues by making the lower or outlet end of the conduit of small bore. This is particularly useful in motor vehicles where it might not be possible to accommodate a large outlet as a structure of standard size. A pipe having a small outlet, even one sealed at the inlet end, is adapted to permit oil to flow from the upper end to the lower end without having that flow force the air out of the intervening pipes of larger diameter. It therefore follows that any oil put into the top end of such pipe causes emission promptly of a corresponding quantity of oil at the lower end of the pipe, so that such pipe even though not vented at the top, will promptly transmit oil from the top to the bottom without the time interval required to fill it up.

To avoid unduly weakening the ball stud by the use of large bores and thereby also reducing the effective bearing surface thereof, I, accordingly, make the bores 52—53 and 54 of small diameter, as shown, in the order of $\frac{3}{16}''$ or less. Also to avoid undue weakening of the eye 23 by the use of the large bushing required for mounting the large diameter pipe 46, I prefer to provide a short terminal pipe length 55 of smaller diameter. The conduit length 55 is preferably telescoped and soldered into the end of pipe 46. A strap 56 may be used at said soldered connection to lash the pipe to the tie rod arm 22.

The stud and the small terminal pipe have bores of diameter so small that oil fills and is normally retained therein. The lubricant in these small outlet bores thus serves as an oil seal at the outlet end of the distributing pipe of effectiveness similar to that of the gasket at the inlet to the knuckle piping system.

The short downwardly extending column of lubricant in the bores 55, 53, does not exert sufficient tension upon the more considerable volume of air within the main length of pipe 46 to effectively attenuate the air so that the upper end of the lubricant column in the bearing stud and in piping length 55 remains under atmospheric pressure. Accordingly, in operation, lubricant delivered through the drip plug and trickling down through the length of pipe 46 will settle on top of the column at the outlet terminal and will cause a corresponding quantity of lubricant to escape through lateral ports 54 into the bearing.

Inasmuch as lubricant is trapped in the upwardly inclined pipe 57' and the ball stud 28 leading to the drag link bearing and, therefore, blocks the escape of air through the length of said pipe, the difficulty may arise that air at the inlet end of the piping above the level of lubricant in pipe 57, may block the entry of lubricant to be admitted and thereby interfere with the oiling of the steering arm bearing.

To obviate such air blocking, the pipe 57 leading to the steering arm is of relatively large bore, as in the case of pipe 46, previously described, which supplies the tie rod arm.

Thus, the lubricant admitted to the steering arm pipe will readily flow without air blocking, down through the large bore pipe 57 to combine with the lubricant trapped in the conduit 57'. As a consequence of the addition of lubricant at the inlet end of pipe 57', the level must rise at the outlet end, and, accordingly, lubricant will overflow through the ports 54' to the steering arm bearing (not shown).

It is desired in general, although this is not necessary, to use the smallest pipe consistent with operativeness. Accordingly, as shown in the drawings, the parts of the pipe 57 below the inlet ports 54' may be of small diameter, for instance, $\frac{1}{8}''$ internal bore, inasmuch as lubricant trapped and filling said part of the pipe precludes air blocking. No air blocking will occur in first applying lubricant to the new or dry equipment, since the lubricant once entering the small pipe will cause the air in advance thereof to pass on outward at the bearing end.

In operation, upon application of pressure at the central source, from which the knuckle bearings are supplied with lubricant, the drip plug will slowly deliver say a dozen drops of lubricant, which will drip through port 35 into well 36.

Such lubricant settles in the well 36 from which a little will seep directly to the upper king pin bushing 18 to lubricate the latter. The bulk of the lubricant will drain off through the pipes 46 and 57 to the tie rod and drag link bearings. Such lubricant as passes inward over the bottom of the notch 40 will flow downward through the longitudinal king pin bore 38 and through the radial bore 39 to lubricate the roller bearing 20 from which excess drains downward to lubricate the lower king pin bushing 19.

The longitudinal bore 38 permits ready flow of lubricant by reason of its large diameter and by reason of the fact that any air displaced in such flow readily passes through notch 40 to enter the annular well 36, thereby replacing the lubricant which has passed from said well into the king pin.

The notches 42 and 43 in the upper bushing 18 are preferably identical, so that equal division takes place of the lubricant overflowing through tubes 47 and 47' supplied therefrom. The lubricant from tube 47 passes into the pipe 46, from which it flows downward by gravity to the tie rod bearing. The lubricant from tube 47' is directed into the steering arm, air blocking being prevented by reason of the large diameter of the pipe section 57. The lubricant admitted is thus readily deposited on top of that trapped in the downward bend of pipe 57' and causes a corresponding rise of lubricant at the bearing end thereof with consequent delivery to the drag link bearing surface.

The king pin, the drag link and the tie rod bearings each receive clean oil direct from the distributing well 36, said bearings being supplied in parallel. The king pin bearing surface is completely enclosed as shown, avoiding the possibility of entry of dirt, dust or water or the leak of lubricant therefrom, so that only minute quantities of lubricant need be and are supplied thereto and the bearing surface is yet effectively lubricated. The difficulties and reorganizations needed for one or more of the other bearings to be supplied with lubricant derived from a bearing of the king pin are thus obviated.

Thus, even though the oil-soaked gasket 37 at the top of the knuckle, in excluding dirt, substantially seals against venting or entry of air, the flow of lubricant nevertheless takes place as if the system were vented, the air within the system merely remaining or moving about therein, out of the path of flowing lubricant, and never becoming imprisoned between columns or bodies of lubricant. As lubricant passes out of any pipe to a bearing, air from another part of the system may enter to maintain substantially atmospheric pressure in the connecting piping between the bearings. Without using large axial holes in the ball stud and without using large weakening radial holes in the king pin of a steering knuckle, I thus reconstitute the parts so that the desired quantity of oil flows to each bearing that I desire to lubricate, as if it flowed down open troughs by gravity, reaching its terminals promptly after the oil has been supplied to the central distributing place, just as promptly as if there were no tendency of the parts to siphon from one to the other, and as if there were no air blocking, the delivered oil, moreover, remaining clean in transit.

It will be seen that by the arrangement described, each of the bearings of the knuckle receives by ordinary gravity flow, a sufficient supply of lubricant for the desired purposes. None of the lubricant once delivered to a higher bearing, will subsequently be abstracted therefrom by siphoning through a bearing at lower level.

It will be seen that the conduit is rigidly sustained along the structural parts of the knuckle and in non-flapping relationship with respect thereto and is inherently protected preferably by being arranged on the rear and protected sides of the arms, so that it is unlikely to be injured in use.

The invention though shown embodied in a knuckle of the reverse Elliott type is applicable also to knuckles of the Elliott type. Such application is shown and specifically claimed in my copending application, Serial No. 56,435 filed September 15, 1925.

While the invention has a preferred application to the lubrication of steering knuckles, it will be understood that certain of the broader features thereof are of more general application in other relations and more especially in relations in which it is desired to lubricate by gravity flow from a remote source, concurrently two or more bearings at different levels.

I claim:—

1. In a mechanical installation, the combination of a swiveled structure, a pair of bearings thereon at different levels spaced from the swivel mount and movable thereabout, a common source of lubricant at said swiveled structure and at level higher than said bearings, conduit means connecting said common source with said bearings to supply the latter from said source by gravity flow, said conduit means affording open passage from the higher bearing to the lower bearing in communication with each other at all times, said passageways being constructed and arranged to maintain substantially atmospheric pressure therein at all times.

2. In a motor vehicle, the combination of an axle, a knuckle assembly including a pivot mount on said axle, a tie rod and a drag link arm protruding from the knuckle, having bearings thereon and lubricant inlet means rigid with said axle for supplying said bearings, said assembly including passageways extending along and substantially fixed with respect to said arms for supplying lubricant from said inlet means to said bearings in parallel, said passageways affording open communication between said bearings and being constructed and arranged to maintain substantially atmospheric pressure therein at all times.

3. In a mechanical installation, in combination, a pair of bearings at different levels, a common source of lubricant at level higher than said bearings, piping connecting said common source with said bearings to supply the latter from said source by gravity flow, said piping affording an open passage from the higher bearing to the lower bearing, free from obstructing relationship with respect to the flow of lubricant from the common source to the bearings, and means balancing the pressure subsisting in said passage.

4. In a lubricating installation, in combination, a pair of bearings at different levels, a common source of lubricant at lever higher than said bearings, piping connecting said common source with said bearings to supply the latter from said source by gravity flow, said piping affording an open passage from the higher bearing to the lower bearing, and means effecting communication at a portion between the ends of said passage with air under atmospheric pressure.

5. In a lubricating installation, in combination, a pair of movable bearings at different levels, a common source of lubricant at level higher than said bearings, conduits connecting said source to said bearings, a fixed inlet for supplying said common source, means for preventing the entry of dust between said inlet and said common source, while permitting relative movement therebetween as the bearings are moved, and means maintaining substantially atmospheric pressure in said conduit.

6. In a liquid distributing system, in combination, a pair of outlets at different levels, a source from which both of said outlets are supplied, pipes intervening between said source and said outlets, means preventing the entry of air from the exterior to the upper end of said pipes, the pipe to the lower of said outlets extending continuously downward, a part of the length of the pipe to the other outlets extending below such other outlets, thereby forming a liquid trap, the effective cross-sectional area of said piping at parts other than where said liquid is trapped being sufficiently large to permit passage of liquid around any air therein, whereby siphoning of the trapped liquid through the lower outlet is substantially precluded.

7. In a motor vehicle, in combination, a bearing at higher level, an associated bearing at lower level, means for supplying both of said bearings by gravity flow from a common source which is otherwise substantially sealed, the conduit leading to the bearing at lower level being of diameter sufficiently large to permit the simultaneous passage of air and lubricant in opposite directions, whereby siphoning is precluded.

8. In a motor vehicle, in combination, a knuckle pivoted on the end of an axle and having a pair of bearings at different levels, a conduit system supplied by gravity flow from a level higher than both of said bearings and including a pair of ducts extending to the respective bearings, said system being constructed and arranged to maintain air in the upper parts of said ducts at all times at substantially atmospheric pressure.

9. In a motor vehicle, in combination, an axle, a steering knuckle, a king pin affording a pivot mount for the latter on the former, a steering arm rigid with said knuckle and having a ball stud at its outer end, a tie rod ball stud rigid with said knuckle, said ball studs at different levels, means for supplying lubricant to said studs, said means comprising a lubricant inlet fitting fixed to said axle, a lubricant collecting means near the top of the king pin, movable with said knuckle and intercepting the lubricant from said fixed inlet, a dust-excluding gasket interposed between said movable knuckle and said fixed inlet, a pipe installation supplied from said collecting means and extending along parts of said knuckle, one branch along a part of the knuckle to supply the tie rod ball stud, and the other branch along the steering arm to supply the ball stud thereof, and means maintaining substantially atmospheric pressure within said pipe installation.

10. In a liquid distributing system, in combination, a conduit having a portion intermediate its ends at a level lower than both its inlet and its outlet, the inlet end of said conduit extending to a level higher than the outlet, a second conduit supplied from said inlet and having an outlet at a level lower than the outlet of said first conduit, said conduits affording an open passage from the higher outlet through the lower outlet, means maintaining substantially atmospheric pressure in said passage, the length of conduit from said inlet portion and above the level of said first outlet having a bore sufficiently large to permit passage of liquid around the air therein.

11. In a lubricating installation, in combination, a fixed lubricant inlet, a moving structure element supplied from said fixed inlet and having two bearings at different levels, a conduit system carried by said moving structure element having its inlet end in flow intercepting relationship with respect to said fixed inlet and extending to said bearings, the conduit to the upper of said bearings having a part of the length thereof below the level of said bearing, said conduit system affording an open passage from the higher bearing through the lower bearing, means maintaining substantially atmospheric pressure in said passage, the length of said system above the level of said upper bearing having a bore sufficiently large to permit passage of lubricant around the air therein, whereby the conduit will not become air locked.

12. In a lubricating installation, in combination, a fixed axis, a structure member pivoted thereto and having an arm structure extending outward therefrom, provided with bearing outlets at different levels, the structure to the upper of the outlets having a part of the length thereof extending therebelow, a common source of lubricant carried by said structure member and at level higher than said outlets, pipes extending along said structure to said outlets, a fixed inlet carried at said axis for supplying said common source, means for preventing the entry of dust between said inlet and said common source, while permitting the pivoting movement of said structure, the effective cross-sectional area of said pipes at parts other than where the lubricant is trapped being sufficiently large to permit passage of lubricant around any air therein, whereby siphoning of the trapped liquid through the lower outlet is substantially precluded and air lock of lubricant to the upper bearing is also prevented.

13. In a chassis lubricating installation, in combination, a knuckle having a downwardly extending tie rod bearing, a steering arm having a bearing at its outer end at level higher than the length of said arm, conduits extending along the structure of the knuckle to the respective bearings thereof, the conduit along the steering arm thereby determining a trap in which lubricant is normally lodged, a lubricant distributor on said knuckle at level higher than said bearings, delivering to the inlet ends of said conduits, and otherwise substantially sealed, the effective diameter of conduit from the distributer down to a level at least as low as that of the trapped lubricant being of cross-sectional area sufficient to permit passage of lubricant around any air therein, thereby preventing blocking of lubricant for the steering arm, the conduit to the tie rod bearing being of diameter sufficiently large to preclude the formation of a column of lubricant therein of weight sufficient to exert a siphoning action upon the trapped lubricant along the steering arm.

14. A steering knuckle having in combination a tie rod bearing rigid therewith, provided with a downwardly extending ball stud, a steering arm rigid with said knuckle and having an upwardly extending ball stud for the drag link bearing at the outer end thereof, said studs having one or more bores therein of relatively small diameter for feeding lubricant to the respective bearings, means for supplying lubricant to said studs, said means comprising a common source of lubricant on said knuckle at a level higher than both said bearings, a pipe supplied from said source and delivering to the bore of the tie rod stud, a second pipe supplied from said source, following along the length of said steering arm and delivering into the ball stud at the outer end thereof, said source being otherwise substantially sealed, the length of conduit intervening between the level of said latter stud and the lubricant inlet thereto and the main length of conduit to the tie rod stud being of diameter sufficiently large to permit passage of lubricant around any air therein.

15. In a mechanical installation, the combination of a pair of bearings at different levels, a movable structure carrying said bearings, a fixed inlet for supplying lubricant to said bearings, pipes carried by said movable structure for conveying lubricant from said fixed inlet to said bearings, dust-excluding means at said inlet precluding the venting of said pipes, the outlets to the bearings being of diameter so small as to cause lubricant to normally fill the same, and means maintaining substantially atmospheric pressure in said conduits.

16. A pivoted steering knuckle having a pair of bearings at different levels, a fixed inlet to said knuckle, a distributor at the upper part of said knuckle, conduits in draining relation with respect to said distributer extending to said bearings, means rendering the swiveling connection of said distributer with respect to said inlet dust-tight and air-tight, the major portion of the volume of the conduits above the level of the bearings being of bore sufficiently large for flow of lubricant about any air therein.

17. In a motor vehicle, the combination of a fixed king pin, a knuckle having clevis jaws bearing on the ends of said king pin, control bearings on said knuckle at different levels, a distributer well in the upper clevis jaw, a lubricant inlet cap over said distributer affixed with respect to said axle and having a dust-tight, air-tight gasket sealing said distributer, pipes draining said distributer and extending along the knuckle structure to the respective bearings, said distributer having exit ports in communication with said distributer well and the respective pipes for correct division of the lubricant to the bearings.

18. The combination set forth in claim 17 in which the major portion of the communicating volume in the pipes and distributer between the bearings is of cross-section sufficiently large to permit the flow of lubricant about any air therein.

19. In a lubricating installation, the combination of a pair of bearings at different levels, a movable structure carrying said bearings, a fixed inlet for supplying lubricant to said bearings, conduits carried by said pivoted structure for conveying lubricant from said fixed inlet to said bearings, dust-excluding means at said inlet preventing the venting of said conduits, a bearing for the upper part of said movable structure, a cavity enclosed by said bearing to which the fixed inlet delivers and notches in the upper part of said bearing through which said cavity empties to said conduits.

20. In a motor vehicle, the combination of a fixed king pin, a knuckle having clevis jaw bearings on the ends of said king pin, control bearings on said knuckle at different levels, a lubricant inlet fixed with respect to said king pin at the upper end thereof, said knuckle having a dust-tight swiveling mount with respect thereto, a bushing for the upper bearing end of the king pin, a cavity encircled by said bushing into which said inlet delivers, pipes extending along the structure of said knuckle to the respective bearings from near the upper part of said bushing, said bushing having a pair of notches aligned with the upper ends of said pipes through which lubricant from the cavity overflows, the major portion of the volume of the pipes above the level of the bearings being of bore sufficiently large for flow of lubricant about any air therein.

21. In a motor vehicle the combination of a knuckle having a pair of control bearings at different levels, an axle having a knuckle bearing mount rigid therewith, conduit means leading along the knuckle structure from adjacent the upper end of said bearing mount to said respective control bearings, a lubricant inlet carried by said axle adjacent the upper end of said bearing mount, said bearing mount blocking leak of lubricant from said inlet, to permit flow therefrom across the bearing surface of said mount to said conduit means, said conduit means being constructed and arranged to maintain the air in the upper parts thereof at all times at substantially atmospheric pressure.

Signed at New York city, in the county of New York and State of New York, this 15th day of June, A. D. 1927.

JOSEPH BIJUR.